United States Patent

Guertin

[19]

[11] Patent Number: 5,977,872
[45] Date of Patent: Nov. 2, 1999

[54] BUILDING EMERGENCY SIMULATOR

[76] Inventor: Thomas George Guertin, P.O. Box 6, R.R. #3, Wakefield, Canada, J0X 3G0

[21] Appl. No.: 09/005,227

[22] Filed: Jan. 9, 1998

[51] Int. Cl.[6] .............................. G08B 29/00; G09B 19/00
[52] U.S. Cl. ......................... 340/515; 340/500; 340/525; 340/286.13; 340/691.6; 340/692; 379/37; 434/118; 364/146; 364/188
[58] Field of Search ..................................... 340/515, 500, 340/525, 286, 286.13, 691.6, 692; 379/37, 38; 434/118; 364/146, 188–190

[56] References Cited

U.S. PATENT DOCUMENTS

| | | | |
|---|---|---|---|
| 4,588,987 | 5/1986 | Stephens | 340/525 |
| 4,670,739 | 6/1987 | Kelly, Jr. | 340/539 |
| 4,816,208 | 3/1989 | Woods et al. | 340/525 |
| 4,933,667 | 6/1990 | Shaw et al. | 340/525 |
| 4,962,473 | 10/1990 | Crain | 340/541 |
| 5,297,252 | 3/1994 | Becker | 340/505 |

FOREIGN PATENT DOCUMENTS

1273487  4/1990  Canada .

Primary Examiner—Donnie L. Crosland
Attorney, Agent, or Firm—Finnegan, Henderson, Farabow, Garrett & Dunner, L.L.P.

[57] ABSTRACT

There is provided a building emergency simulator which can graphically and operationally reproduce various building fire alarm/voice communication/smoke control and other systems and provide means for training personnel to successfully operate systems and manage emergency situations. The emergency simulator includes a computer, screen and projection unit for viewing images received from the computer, software for creating an image of various building emergency systems and programmable for creating a simulation of a response of the building emergency systems to a desired emergency situation, microphone and handset and a trackball pointing device for interacting with the software program.

13 Claims, 6 Drawing Sheets

Configuration

Building Type: ● Office  ○ Hotel  ○ Hospital  ○ Apartment  ○ Mail  ○ Complex

Building Height: [18] Floors

Floor Plan Setup: Number of Elevators: ○ 2  ● 3    Number of Stairwells: ● 2  ○ 3

Panel Setup

| | |
|---|---|
| Panel type: | ● LCD/LED  ○ LCD  ○ LED |
| # of Stages: | ○ Single Stage  ● 2-Stage |
| 2 Stage - No Ack Timer Setting: | [60] seconds |
| Building Alarm Silence Timer: | [20] seconds |
| Panel Alarm Silence: | ● Yes  ○ No |
| Pre-Announcement Tone: | ● Yes  ○ No |
| Mic Press-to-talk Button, Alarm Silence/Restart: | ● Yes  ○ No |
| Next/Previous Buttons: | ● Yes  ○ No |
| Elevator Home LED: | ● Yes  ○ No |
| Fire Department LED: | ● Yes  ○ No |
| Initial Floors 2nd Stage: | ○ None  ● Alarm Floor, above and below |

*Configuration File Name*  [Save] [Load]
C:\REACTOR\CONFIG\CONFIG\DEFAULT.CFG

*Pre-Program File Name*  [Edit] [Load]
D:\REACTOR\CONFIG\DEFAULT.PRE

Elevator Light On: ● Yes  ○ No
Fire Depart Light On: ● Yes  ○ No   after [60] seconds

Panel Setup

| | | | |
|---|---|---|---|
| 1st Stage Sound: | ● Bell Tone | ○ Horn | ○ Chime  ○ Whoop  ○ None |
| 2nd Stage Sound: | ● Bell Tone | ○ Horn | ○ Chime  ○ Whoop  ○ None |
| Tbl/Phone Buzzer: | ● Yes | ○ No | |
| Fire Engine Arrive: | ● Yes | ○ No | |
| Crowd Noise: | ● Yes | ○ No | |

● Lobby Panel   ○ Command Center Panel

Other

| | |
|---|---|
| Floor Emergency Response Team: | ○ Yes  ● No |
| Floor Emergency Telephone Press-to-Talk Bar: | ○ Yes  ● No |
| Electromagnetic Locks (Office): | ○ Yes  ● No |

○ Display Billboard Screen

[Exit]

FIG. 5

SAMPLE CODE ASSIGNMENT TABLES (OFFICE) - USED TO CREAT EACH 6 CHARACTER EVENT
e.g. Office: AB[B01]N = Alarm, Heat Detector, Floor 12, North

| 1st Code<br>Event Type | 2nd Code<br>Device Type | 3rd Code<br>Location | 4th Code<br>Direction |
|---|---|---|---|
| A = Alarm | A = Manual Pull Station<br>B = Heat Detector<br>C = Smoke Detector<br>D = Sprinkler Flow Switch<br>E = Air Handling Smoke | Zone location (in matrix format e.g. column, row). See *Office Zone Matrix* below. | N = North<br>S = South<br>E = East<br>W = West |
| T = Trouble | A = Speaker Trouble<br>B = Magnetic Door Hold-Open<br>C = ElectroMagnetic Door Lock<br>D = Lamp Failure<br>E = Open Circuit<br>F = Paging Trouble<br>G = Telephone Trouble | Zone location (in matrix format e.g. column, row). See *Office Zone Matrix* below. | N = North<br>S = South<br>E = East<br>W = West |
| S = Supervisory | A = Sprinkler System Control Valve<br>B = Fire Pump Power Failure<br>C = Standpipe Main Control Valve | Zone location (in matrix format e.g. column, row). See *Office Zone Matrix* below. | N = North<br>S = South<br>E = East<br>W = West |
| P = Telephone | X | Zone location (in matrix format e.g. column, row). See *Office Zone Matrix* below. | X |

OFFICE ZONE MATRIX - 3RD CODE CHARACTER ALPHA-NUMERIC CODE (COLUMN/ROW):

| | A<br>Alarm Zone | B<br>Alarm Zone | C<br>Alarm Zone | D<br>Alarm Zone | E<br>Alarm Zone | F<br>Alarm Zone |
|---|---|---|---|---|---|---|
| 01 | Floor 24 | Floor 12 | Basement | Atrium Grd | Sprink Fl 15 | Sprink Fl 3 |
| 02 | Floor 23 | Floor 11 | Park 1 | Computer Fl 10 | Sprink Fl 14 | Sprink Fl 2 |
| 03 | Floor 22 | Floor 10 | Park 2 | Kitch Rge Grd | Sprink Fl 13 | Sprink Grd |
| 04 | Floor 21 | Floor 9 | Stairwell A | Sprink Fl 24 | Sprink Fl 12 | Sprink Bsmt |
| 05 | Floor 20 | Floor 8 | Stairwell B | Sprink Fl 23 | Sprink Fl 11 | Sprink Park 1 |
| 06 | Floor 19 | Floor 7 | Stairwell C | Sprink Fl 22 | Sprink Fl 10 | Sprink Park 2 |
| 07 | Floor 18 | Floor 6 | Elevator 1 | Sprink Fl 21 | Sprink Fl 9 | Sprink Mech Bsmt |
| 08 | Floor 17 | Floor 5 | Elevator 2 | Sprink Fl 20 | Sprink Fl 8 | Sprink Elect Bsmt |
| 09 | Floor 16 | Floor 4 | Elevator 3 | Sprink Fl 19 | Sprink Fl 7 | Sprink Atrium Grd |
| 10 | Floor 15 | Floor 3 | Elev Pent | Sprink Fl 18 | Sprink Fl 6 | Spr Comp Fl 10 |
| 11 | Floor 14 | Floor 2 | Mech Bsmt | Sprink Fl 17 | Sprink Fl 5 | Spare |
| 12 | Floor 13 | Ground | Elect Bsmt | Sprink Fl 16 | Sprink Fl 4 | Spare |

Back to Panel

FIG. 6

BUILDING EMERGENCY SIMULATOR

FIELD OF THE INVENTION

The present invention relates to the field of emergency simulator training systems.

BACKGROUND OF THE INVENTION

High rise buildings have long been equipped with complex, one or two stage integrated fire alarm and voice communications systems designed to manually or automatically notify occupants of potential fire or emergency situations. The two stage system and/or voice communication component allows staff to take control of the system and broadcast essential voice messages when, and as required, in order to manage a staged evacuation process involving hundreds or even thousands of evacuees where immediate total evacuation may not be in the best interest of the building occupants.

Owners of buildings are responsible for the fire alarm and voice communications system and for personnel training on the use of these systems. Because these systems are always in operation, training is next to impossible and rarely happens. If training were conducted, it would have to be outside of regular business hours when the building occupants are not present which can be expensive in consideration of overtime paid to staff. Furthermore, it can be time consuming and problematic to reset the system before and after training and to notify fire and other emergency response departments that any alarms are as a result of training and not real emergencies. In addition, these systems respond in real-time with equipment spread throughout the building which does not lend itself to any degree of proper training.

The lack of staff training at the emergency location results in further problems for responding fire department officers and other emergency response personnel who are faced with building staff who are not fully trained and therefore the officers must determine system operations at the time of the incident. Their burden is complicated by the range of different systems installed in buildings. This burden results in a loss of critical time which leads to further complications and the possible escalation of a crisis situation.

Furthermore, at the present time, fire departments and other emergency response teams do not have a means of receiving training in using the various building emergency systems or managing building evacuations.

There, therefore, is a need for a training system for fire departments and other emergency response teams to become familiar with the various building emergency and communications systems. There also is a need for building personnel to receive training in the emergency systems and emergency procedures in preparation for real life crisis situations.

SUMMARY OF THE INVENTION

There therefore is provided a computer-based emergency simulator which can graphically and operationally reproduce various building fire alarm/voice communication/ smoke control and other systems and provide means for training personnel to successfully operate systems and manage emergency situations.

Therefore, in one aspect of the present invention, there is provided an emergency simulator for training personnel in building emergency systems comprising: a computer; viewing means for displaying images received from said computer; software for creating an image of various building emergency systems and programmable for creating a simulation of a response of said building emergency systems to a desired emergency situation; and communication means for interacting with said computer software for responding to said emergency situation.

In another aspect of the present invention there is provided a simulator of building emergency systems for training personnel in the operation of such systems and emergency response procedures for responding to emergencies in a building comprising: a computer; viewing means for displaying images received from said computer; software for displaying a programmed image of building emergency systems and programmable for creating appropriate warnings by said building emergency systems for simulating an emergency situation; said software adapted for receiving responses from the trainee in response to said warnings from said building emergency systems; and first communications systems means for interacting with said software for responding to said warnings.

In a further aspect of the present invention there is provided a method of training personnel in the operation of building emergency systems and in the proper procedures for responding to building emergencies comprising the steps of: providing a simulator having a computer, viewing means for displaying images received from said computer, and communications systems means; providing software for displaying a programmed image of building emergency systems and programmable for creating appropriate warnings by said building emergency systems for simulating an emergency situation; configuring said software to generate a displayed simulation of desired building emergency systems; selecting a pre-programmed emergency from said software; and initiating said emergency.

BRIEF DESCRIPTION OF DRAWINGS

Preferred embodiments of the present invention will now be described and may be better understood when read in conjunction with the following drawings in which:

FIG. 6 is an example of code assignments used to create "events" for a 24 floor office building.

DETAILED DESCRIPTION OF PREFERRED EMBODIMENT

Figure 1:
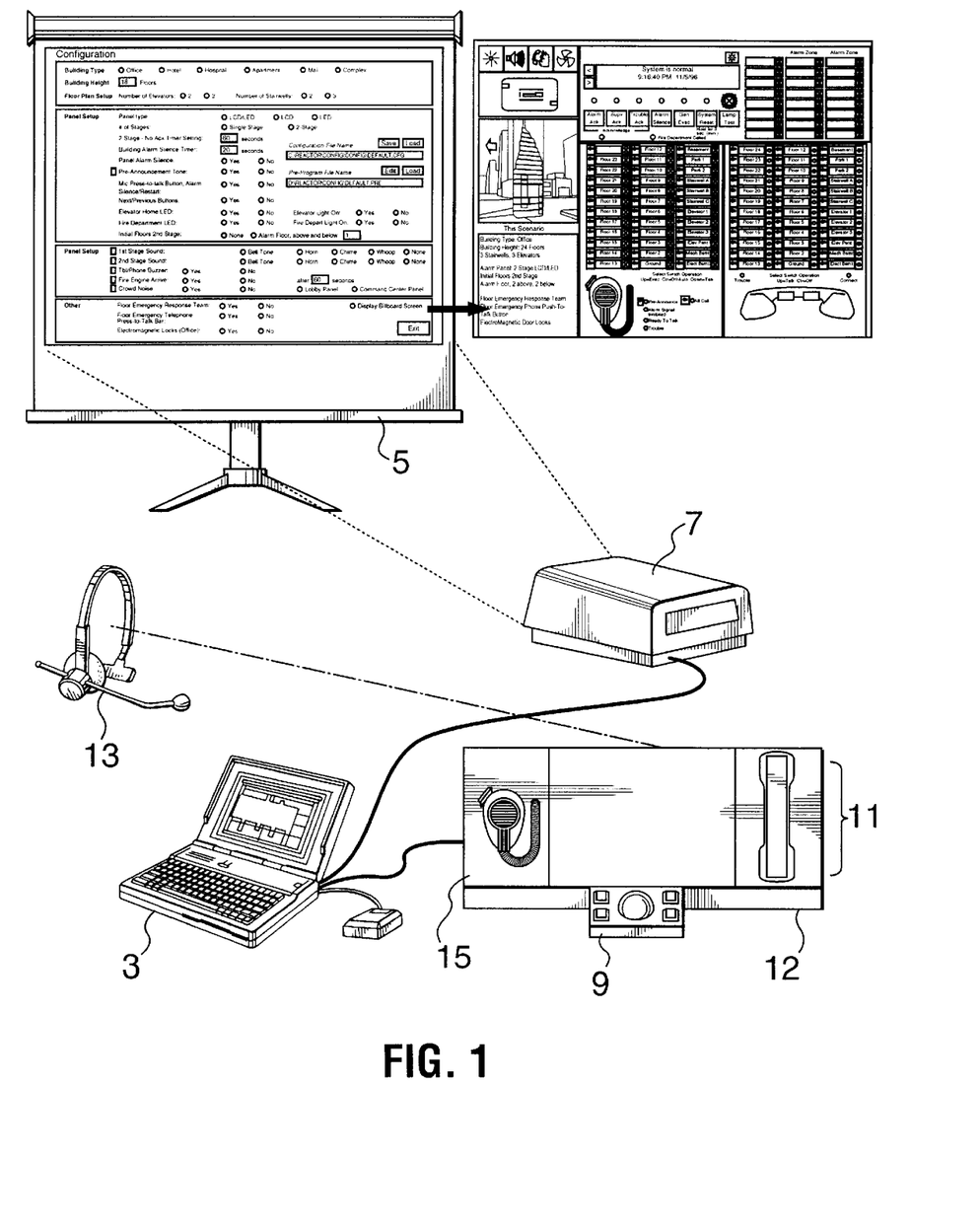
FIG. 1 is a schematic diagram of the system logic for the simulator of the present invention.

The emergency simulator of the present invention is a computer-based training system which simulates a building command centre environment. The instructor pre-programs the computer software and produces a desired simulated emergency situation. FIG. 1 illustrates the simulator system logic which will be described in further detail below. An instructor supervises training sessions for personnel. The simulator includes a computer 3, simulator software, viewing screen 5, projector 7 for projecting an image from the computer 3 onto the screen 5, trackball pointing device 9, communications systems 11 corresponding to those systems used by the trainees in real life, and communications receiving device 13 used by the instructor for responding to the trainees, actions.

Figure 2:
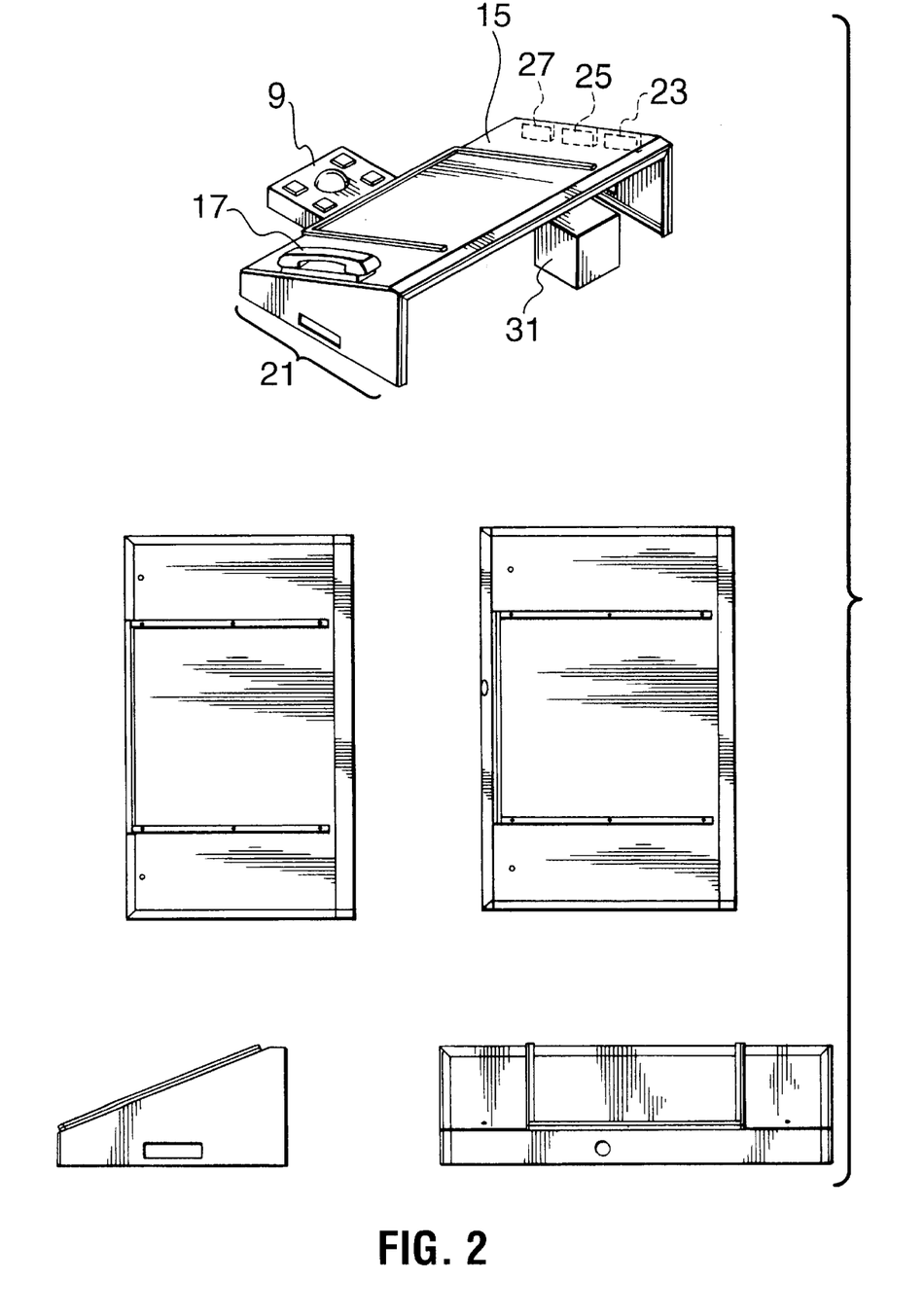
FIG. 2 is a perspective view of the console housing and components used in the simulator of the present invention.

FIG. 2 depicts a schematic of the customized simulator communications console 12. This console simulator incorporates both "real" fire alarm/voice communication system controls (press-to-talk microphone 15 and emergency telephone handset 17) as well as "virtual" controls (trackball pointing device 9) to allow trainees to manipulate on-screen actions. The inclined top-side of the console housing incorporates the "real" communications hardware. The front of the console housing 21 facilitates the integration of the "virtual" control. For trainee reference, the centre area of the inclined top-side of the console 21 allows the instructor to affix an instruction card based on the operation of the fire alarm/voice communication system projected onto the screen 5.

The microphone component allows trainees to practice broadcasting a range of appropriate building emergency voice messages during instructor/computer initiated simulations.

The microphone 15 is wired to its electronic sub-components mounted on the left underside of the console housing. These sub-components include a Logic Controlled Relay 23, a Voice-Over/Paging Unit 25 and a Microphone Pre-amplifier 27. An additional sub-component is a computer serial port adapter (or equivalent computer interface) designed to facilitate integration of the microphone with the computer thus allowing on-screen visual indicators to function as designed, and if chosen to be configured within the software, also causes interruption of software-generated alarm sounds.

The console emergency telephone handset component allows trainees to simulate communication as they would with "real" emergency telephones installed on floors throughout a high rise building. The console emergency telephone handset 17 is equipped with a modified headset 13. The handset 17 is wired to a full duplex VHF communicator beltpack mounted on the right underside of the console housing. Since this system is a simulator, rather than having remote floor telephones, the console emergency telephone is in two-way wireless communication with an instructor wearing a fully compatible full duplex VHF communicator beltpack and headset 13. This allows the instructor to role-play those individuals who would normally use the floor emergency telephones in reality (e.g. fire department officials, building supervisory staff, floor emergency response team members) and create various emergency events.

Integrated into the front and near the middle of the console housing is a trackball pointing device 19. The trackball is connected to the simulator computer system. This device allows trainees to activate a functional on-screen pointer. A special adapter is used to allow for two functional on-screen pointing devices, one used by the trainee controlling the console trackball, one used by the instructor controlling another pointing device connected to the computer. This arrangement allows an instructor to take control of the system from a trainee when required during a simulation.

The microphone 15, emergency telephone 17 and optional console light are connected to power adapters which are wired into a centralized housing 31 to facilitate one power connector to a power source.

The computer software shown in the accompanying Figures is designed to run on a PC notebook computer 486DX266 with a minimum of 8 mb RAM and preferably 16 mb RAM. The computer 3 includes 20 mb hard disk space and an SVGA monitor. At least one PS/2 port and mouse are needed along with a sound card and Windows95™. Preferably, the image from the computer screen is projected onto a viewing screen 5 using an LCD projector 7 having a minimum 800×600 resolution. The projector 7 should be equipped with built-in speakers and associated cabling. An alternate option is an LCD projection panel with high-lumen output overhead projector and external speakers although any suitable projection unit may be utilized.

Figure 3:
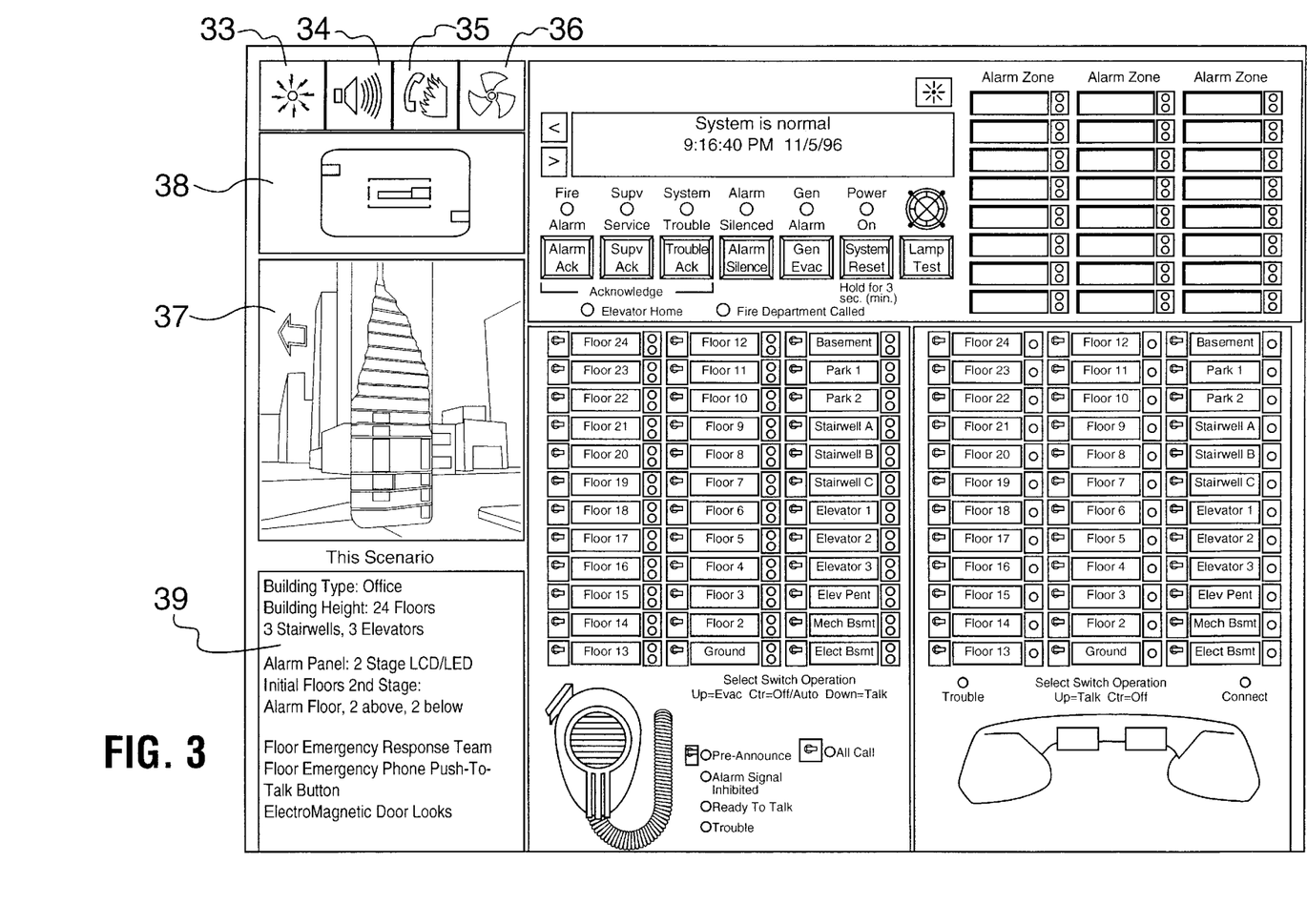
FIG. 3 shows one example of a panel screen used in a training session using the simulator of the present invention.
Figure 4:
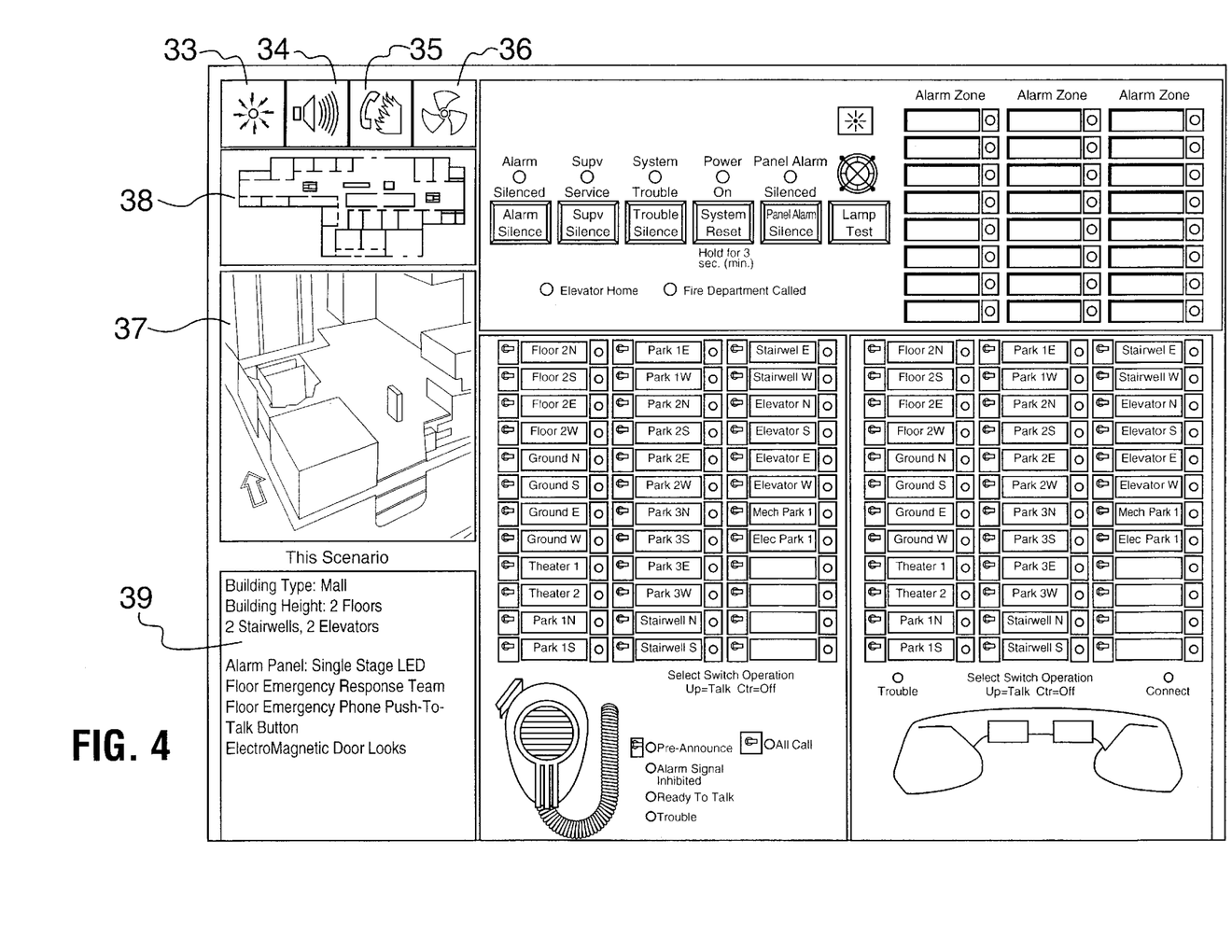
FIG. 4 shows another example of a panel screen used in a training session using the simulator of the present invention.

The computer software is configured to display systems which closely match the operations of the actual site-specific building systems such as fire alarms, voice communications, smoke control systems as well as the layout of the building including the number of floors and the location of stairwells, elevators and emergency exits. The panel screen displayed during the simulator training session will include a representation of these operating systems as well as the floor layout. Examples of panels screens are shown in FIGS. 3 and 4. In general, the panel screen includes four activatable or "clickable" buttons at the top left of the screen. These buttons will display various emergency system modules when activated or "clicked" on by the pointer and hide these modules when clicked on again. The far left button 33 in FIGS. 3 and 4 display the alarm control/annunciation module. This module will display the master fire alarm panel zone display when activated. The next button 34 displays the paging control module. The third button 35 displays the emergency telephone control module and the fourth button 36 displays the fan/damper control module screen. Within the fan/damper control module screen, button selections generate visual LED display only. There is no impact or integration with the program or panel screen but merely allow a trainee to make selections where the instructor can determine whether the correct choice was made. For example, to handle simulated smoke control, a trainee would "click" on the fan/damper control module button 36 and activate the fan and ventilation systems. However, this action does not activate any further integrated systems within the simulator but would merely indicate to the instructor that the trainee was aware of the proper procedures in the simulated circumstances. On the left side of the panel screen are miniatures of the building cut-away screen 37 and the floor schematic screen 38. "Clicking" on these miniatures will send the trainee to the appropriate activated screen. The scenario information box 39 displays information particular to the building and the given simulation and is a reference box only. FIG. 3 depicts a panel screen used in a training session for an office building having twenty-four floors, three elevators, and three stairwells. The alarm panel is a two stage LCD/LED and includes a floor emergency response team, floor emergency phone push-to-talk button and electromagnetic door locks. FIG. 4 is an example of a panel screen configuration for a mall having two floors and a single stage LED alarm panel.

A pre-programmed simulated scenario may be initiated from the panel screen using the function keys. The function keys also allow events within the program to be omitted or repeated. At any time, an event can be manually initiated by entering the appropriate codes. Once the simulated scenario is initiated, the systems shown on the panel screen begin to respond in the same manner as the actual systems in a building would respond as if the scenario were actually taking place within the building. The trainees proceed under the supervision of an instructor to respond to the scenario using the trackball pointer and communications console to perform the appropriate response procedures.

Figure 5:
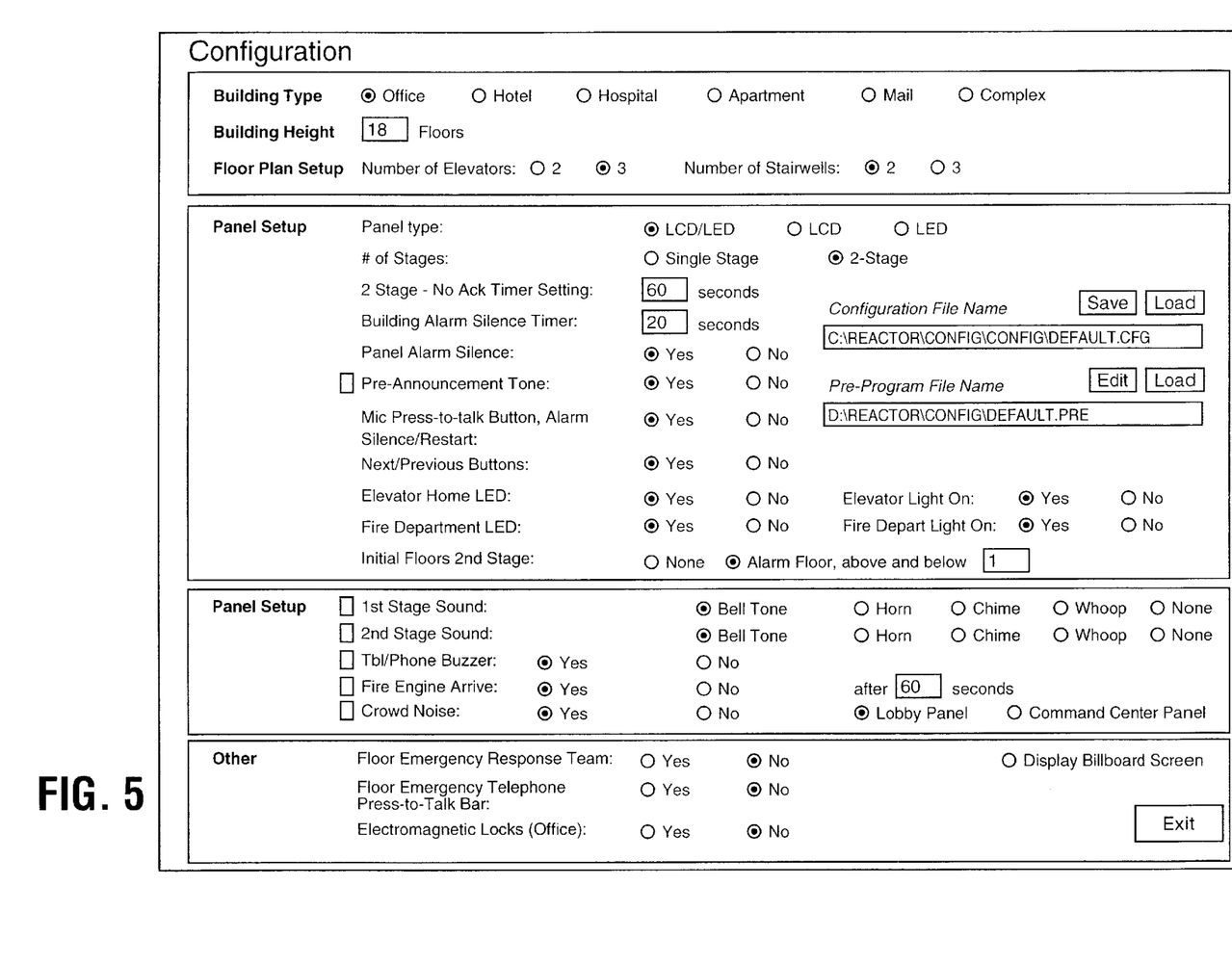
FIG. 5 shows an example of the configuration options available for the simulator for producing a desired simulation.

The computer software is configured prior to a training session on the simulator to establish the appropriate systems and emergency situation enactments. An example of some of the configuration options are shown in FIG. 5. Once programmed, a configuration may be saved within the program and reused as needed.

Each scenario is comprised of pre-established emergency "events". An "event" is an instructor initiated action consisting of a six character alpha-numeric code based on a matrix designed for each building type that represents an alarm condition, trouble condition, supervisory device trouble or emergency telephone, a particular fire alarm system device (for example a heat detector), the general location (for example floor twenty-four) and/or a more specific location (for example north side). Events are generally pre-programmed whenever possible but may be instructor initiated and manually keyed at any time throughout the training session. Any number of events may be entered into the program and simulated during a training session. Examples of the code assignments which may be used to create events in an office building are shown in FIG. 6.

Prior to a simulation exercise, the instructor makes selections determining a number of preliminary screens for general information. For example, a simulated city screen will show the range of buildings in a graphic "Cityscape" and allow the instructor to proceed to a cut-away based on the selected building, for example an office, hotel, hospital, apartment or mall. The instructor may also select a screen showing a schematic diagram of the layout of the floors within the building. Once at the panel screen which is the main trainee working screen, the trainee can access the building cut-away or floor schematic screens for reference purposes.

The following is a description of a sample training session where a simulation is initiated using the building emergency simulator of the present invention. Prior to the simulation, a trainee will undergo an orientation session to become familiarized with the simulator and principles of emergency management.

The following abbreviations are used in the description of the example training session:

BEC Building Emergency Coordinator (event decision-maker; may use press-to-talk microphone and operates controls within the Alarm Control/Annunciation and Paging Modules of the on-screen system)

VCO Voice Communication Operation (uses press-to-talk microphone and operates controls within the Alarm Control/ Annunciation and Paging Modules of the on-screen system)

ETO Emergency Telephone Operator (uses console emergency telephone handset and operates controls within the Emergency Telephone Module of the on-screen system)

ERT Emergency Response Team member (Floor Warden)

Trainees take their position at the simulator system. The VCO and ETO sit behind the console while being attentive of the on-screen system. The BEC stands behind the VCO and ETO. All are now ready to begin. The following simulation may be typical of a fire alarm occurrence. Note that some areas of the table below are instructor initiated events based on the pre-programmed simulation exercise. Other areas of the table are trainee response/actions in reaction to these initiated events. The instructor is always evaluating responses and offering corrective action as required:

| ACTION BY | ACTION |
|---|---|
| Instructor | Initiates first event (fire alarm) in pre-programmed simulation by activating appropriate function key on notebook computer. Alarm device and location is displayed on the on-screen system. Alarm sound and other sounds are generated by the software. |
| VCO/BEC | Confirms alarm location on the on-screen system (and device if applicable); record information on status sheet. |
| BEC | Decisions made to handle emergency simulation are based on numerous factors and assumptions. |
| VCO/BEC | Operates appropriate system buttons within the Alarm Control/Annunciation (based on type of system) such as "Alarm Acknowledge" and "Alarm Silence". (Uses the console trackball pointing device to click on on-screen buttons). |
| VCO | Removes press-to-talk microphone from its console cradle and broadcasts appropriate All Call message requesting designated floors to evacuate - all others standby. (Uses the console trackball pointing device to click on on-screen All Call button). De-selects on-screen All Call button when finished message. |
| BEC/ETO | Role-plays calling Fire Department to advise of known details. |
| BEC | Role-plays dispatching of appropriate staff (Security/Deputy BEC/other) as required including staff to meet Fire Department at response location. (Other trainees may role-play these staff members when not using the simulator.) |
| Instructor | Initiates second event (simulation of floor emergency telephone) in pre-programmed simulation by activating appropriate function key on notebook computer. Telephone call-in buzzer sounds; appropriate floor zone LED is displayed (flashing on the on-screen system). |
| ETO/ Instructor | Removes emergency telephone handset from its console cradle, uses the console trackball pointing device to click on on-screen floor toggle switch. Toggle switch points up and associated LED illuminates steady. ETO now talks to caller (instructor via wireless headset simulating via floor emergency telephone), receiving and recording information on status sheet while verbally relaying relevant detail to BEC (and/or Fire Department Officer if arrived; role-played by other trainees). De-selects on-screen floor toggle switch when finished. |
| VCO | Broadcasts appropriate All Call message to next group of floors (usually the top two or three floors of the building depending on number of evacuees) - all others standby. De-selects on-screen All Call button when finished message. |
| VCO | Broadcasts appropriate All Call message to additional floors to evacuate as required until Fire Department (role-played) advises to stop, or may involve continuing in this manner until building completely evacuated. May broadcast a variety of messages depending on circumstances with messages being broadcast in the All Call or Select Call (one floor) as required. |
| ETO | Responds to and manages all calls received as noted in the Emergency Telephone Module in a manner as previously described. |

-continued

| ACTION BY | ACTION |
|---|---|
| Instructor | End of simulation exercise<br>Instructor performs a System Reset and proceeds to next "team" of trainees and next pre-programmed simulation exercise. |

While the invention has been described with reference to preferred embodiments, those skilled in the art will understand that modifications and alterations may be made without departing from the scope of the invention. Therefore, it is intended that the invention should not be limited by the foregoing description.

I claim:

1. A system for use in training personnel in building emergency procedures and the use of building emergency systems, said training system comprising:
    a computer having a storage medium;
    a viewing device for displaying images output from said computer;
    input means including a first pointing device for controlling the position of pointer on said viewing device and an audio system having a loudspeaker;
    a second pointing device for use by one or more trainees and connected to said computer for controlling the position of a pointer on said viewing device for selecting simulated controls displayed thereon; and
    an emergency procedure training program in said computer comprising:
        a first configuration system for use by an instructor in specifying building, video, and audio parameters and for storing first configuration data in said storage medium;
        a second configuration system for use by said instructor for specifying one or more emergency events and for storing second configuration data in said storage medium; and
        a main system for use during training sessions for:
            displaying images of an emergency system control panel on said display screen in accordance with parameters in said first configuration data and responsive to one or more trainees' inputs via said second pointing device for updating said control panel images, and
            operating said audio system in accordance with parameters in said first and second configuration data.

2. A system as defined in claim 1 wherein said emergency training program further includes:
    a first communication system for simulating telephone communications between
    an emergency control center and emergency telephones located in a building for use by an instructor and one or more trainees; and
    a second communication system for simulating a public address system and for use in practicing broadcasting building emergency voice messages during emergency situations, said second communication system including a press-to-talk microphone.

3. A system as defined in claim 2, said main system being operable to display images containing an alarm control/annunciation module, a paging module, an emergency telephone control module and fan/damper control module and being responsive to predetermined inputs for initiating said emergency events based on said second configuration data.

4. A system as defined in claim 3, said main system being further operable to display a floor layout of a building according to said first configuration data and display emergency system control modules including a fire alarm module, a voice communications module and a smoke control system module for selectively displaying each of said modules.

5. A system as defined in claim 2, said first configuration system being operable to receive input respecting building parameters including the type of building to be simulated, the number of floors, stairwells,and elevators in said simulated building, the type of building emergency system in said simulated building, the content of the display images and parameters respecting said audio system during operation of said main system.

6. A system as defined in claim 2, said first communication system including:
    a headset for use by the instructor in simulating emergency telephones located in a building and having a microphone, an ear phone, and electrical circuitry associated with said headset microphone and ear phone for transmitting and receiving wireless communication signals; and
    a telephone handset and associated electrical circuitry for use by one or more of said trainees for transmitting and receiving wireless communication signals to and from said headset, said telephone handset simulating a telephone located at an emergency control center of a building for enabling one or more of said trainees to practice predetermined telephone communication procedures during emergency situations.

7. A system as defined in claim 2, said second configuration system being responsive to a predetermined input for accepting an alpha-numeric code representative of one of a plurality of alarm conditions, one of a plurality of trouble conditions, one of a plurality of supervisory device trouble conditions, one of a plurality of emergency general locations, and one of a plurality of emergency specific locations and for storing one or more of second configuration data.

8. A system as defined in claim 6, said electrical circuitry including a full duplex VHF system.

9. A system as defined in claim 2, said second communication system including a logic controlled relay, a voice-over/paging unit, a microphone pre-amplifier associated with said microphone, and a computer serial port adapter for connection to said computer, said main system being responsive to a predetermined input from said adapter for interrupting sounds generated by said system.

10. A system as defined in claim 8, wherein the full duplex VHF system is attached to a control console.

11. A system as defined in claim 9, wherein the second communication system is attached to a control console.

12. A system for use in training personnel in building emergency procedures and the use of building emergency systems, said training system comprising:
    a computer having a storage medium;
    input means including a first pointing device for controlling the position of a pointer on a viewing device and an audio system having a loudspeaker;
    a viewing device for displaying images output from said computer;
    a first communication system for simulating telephone communications between an emergency control center and emergency telephones located in a building for use by an instructor and one or more trainees;

a second communication system for simulating a public address system and for use in practicing broadcasting building emergency voice messages during emergency situations, said second communication system including a press-to-talk microphone;

a second pointing device for use by one or more of said trainees and connected to said computer for controlling the position of a pointer on said viewing device for selecting simulated controls displayed thereon; and an emergency procedure training program in said computer comprising:
- a first configuration system for use by said instructor in specifying building, video and audio parameters and for storing first configuration data in said storage medium;
- a second configuration system for use by said instructor for specifying one or more emergency events and for storing second configuration data in said storage medium; and
- a main system for use during training sessions for:
  - displaying images of an emergency system control panel on said display screen in accordance with parameters in said first configuration data and responsive to trainee inputs via said second pointing device for updating said images, and
  - operating said audio system in accordance with parameters in said first and second configuration data.

13. A system for use in training personnel with respect to building emergency procedures and the use of building emergency systems, said training system comprising:
- a computer having storage medium, a keyboard, a first display monitor, a first pointing device for controlling the position of a pointer, and an audio system having a loudspeaker;
- a second display screen;
- a communication console for simulating an emergency system control console having an inclined top surface;
- a first communication system for simulating telephone communications between an emergency control center and emergency telephones located in a building, said first communication system including:
  - a headset for use by an instructor and having a microphone and ear phone and a full duplex VHF system electrical circuitry associated with said headset microphone and ear phone for transmitting and receiving wireless communication signals, said headset simulating emergency telephones in a building; and
  - a telephone handset and an associated full duplex VHF system mounted on said communications console for transmitting and receiving wireless communication signals to and from said headset, said telephone handset simulating a telephone located at an emergency control center of a building for enabling trainees to practice predetermined telephone communication procedures during emergency situations;
- a second communication system for simulating a public address system and for use by said trainees in practicing broadcasting building emergency voice messages during said emergency situations, said second communication system including a press-to-talk microphone mounted on said communications console, and electrical circuitry having a logic controlled relay, a voice-over/paging unit, a microphone pre-amplifier and a computer serial port adapter for connection to a serial input in said computer;
- a second pointing device, mounted on said communications console and connected to said computer for controlling the position of a pointer displayed on said display screen for use in selecting simulated controls displayed on said display screen; and
- an emergency procedure training program in said computer comprising:
  - a first configuration system operable to receive input respecting building parameters including the type of building to be simulated, the number of floors, stairwells and elevators in the building and the type of building emergency system in said simulated building, the content of the display images during normal operation, and parameters respecting said audio system;
  - a second configuration system responsive to a predetermined input for accepting a six character alpha-numeric code representative of one of a plurality of event types, one of a plurality of device types, one of a plurality of locations and one of a plurality of directions, and for storing one or more of second configuration data; and
  - a main system for use during training sessions for:
    (1) operating said audio system by emitting sounds prescribed by said first configuration data and by interrupting said sounds in response to the use of said press-to-talk microphone said first;
    (2) responding to predetermined inputs for initiating said emergency events in accordance with said second configuration data; and
    (3) displaying images of an emergency system control panel in accordance with parameters in said first configuration data and responsive to trainee inputs via said second pointing device for updating said images, said images including an Alarm Control/Annunciation Module, a Paging Module, an Emergency Telephone Control Module and Fan/Damper Control Module, floor layout of a building according to said first configuration data and to emergency system control modules including a fire alarms module, a voice communications module and a smoke control systems module and controls for selectively displaying each said modules.

* * * * *